(12) United States Patent
Michioka et al.

(10) Patent No.: US 8,033,195 B2
(45) Date of Patent: Oct. 11, 2011

(54) LOW-NOISE SCREW DEVICE

(75) Inventors: Hidekazu Michioka, Tokyo (JP); Hiroshi Niwa, Tokyo (JP); Katsuya Iida, Tokyo (JP); Yoshiaki Saitoh, Tokyo (JP)

(73) Assignee: THK Co., Ltd., Tokyo (JP)

( * ) Notice: Subject to any disclaimer, the term of this patent is extended or adjusted under 35 U.S.C. 154(b) by 337 days.

(21) Appl. No.: 12/278,680

(22) PCT Filed: Feb. 7, 2007

(86) PCT No.: PCT/JP2007/052088
§ 371 (c)(1),
(2), (4) Date: Dec. 3, 2008

(87) PCT Pub. No.: WO2007/091584
PCT Pub. Date: Aug. 16, 2007

(65) Prior Publication Data
US 2009/0293658 A1    Dec. 3, 2009

(30) Foreign Application Priority Data

Feb. 8, 2006    (JP) .................................. 2006-031665

(51) Int. Cl.
*F16H 1/24*    (2006.01)
*F16H 55/02*    (2006.01)

(52) U.S. Cl. .................. 74/424.82; 74/424.86

(58) Field of Classification Search .............. 74/424.81, 74/424.82, 424.84, 424.86, 424.87; 384/43, 384/45, 13

See application file for complete search history.

(56) References Cited

U.S. PATENT DOCUMENTS

| | | | |
|---|---|---|---|
| 5,492,036 A | | 2/1996 | Sato |
| 6,155,717 A | * | 12/2000 | Michioka et al. ............... 384/15 |
| 6,190,046 B1 | * | 2/2001 | Agari ............................... 384/13 |
| 6,364,058 B1 | * | 4/2002 | Nishide et al. .................... 184/5 |
| 6,732,599 B2 | * | 5/2004 | Michioka et al. ............. 74/89.4 |
| 7,637,662 B2 | * | 12/2009 | Kato et al. ....................... 384/43 |

(Continued)

FOREIGN PATENT DOCUMENTS

JP           59-131059 A      7/1984

(Continued)

OTHER PUBLICATIONS

International Search Report of PCT/JP2007/052088, date of mailing Mar. 27, 2007.

(Continued)

*Primary Examiner* — Justin Krause
(74) *Attorney, Agent, or Firm* — Westerman, Hattori, Daniels & Adrian, LLP

(57) ABSTRACT

Provided is a screw device capable of reducing noise generated therefrom.
The screw device has a screw shaft 5 having a rolling-element rolling groove 5a spirally formed on an outer peripheral surface of the screw shaft; a nut 6 having a loaded rolling-element rolling groove 6a spirally formed on an inner peripheral surface of the nut and facing the rolling-element rolling groove 5a of the screw shaft 5 and a rolling-element return path connecting an end of the loaded rolling-element rolling groove 6a with an other end thereof; and a plurality of rolling elements 7 arranged in a rolling-element circulation path. A low-noise plate 12 is mounted on a flange 9 provided at an axial end of the nut 6 so that the low-noise plate 12 covers at least a part of an end surface of the flange 9.

12 Claims, 15 Drawing Sheets

U.S. PATENT DOCUMENTS

| | | |
|---|---|---|
| 2002/0023512 A1* | 2/2002 | Tsukada et al. ............ 74/424.81 |
| 2002/0144560 A1 | 10/2002 | Yatsushiro et al. |
| 2004/0211280 A1* | 10/2004 | Nishimura et al. ........ 74/424.82 |
| 2005/0204836 A1 | 9/2005 | Yatsushiro et al. |
| 2005/0241419 A1 | 11/2005 | Yatsushiro et al. |

FOREIGN PATENT DOCUMENTS

| | | |
|---|---|---|
| JP | 3-33254 U | 4/1991 |
| JP | 6-6795 U | 1/1994 |
| JP | 6-174045 A | 6/1994 |
| JP | 10-264293 A | 10/1998 |
| JP | 11-37247 A | 2/1999 |
| JP | 2002-364726 A | 12/2002 |
| JP | 2005-127379 A | 5/2005 |
| JP | 2005-273680 A | 10/2005 |
| JP | 2005-308081 A | 11/2005 |

OTHER PUBLICATIONS

International Preliminary Report on Patentability (Form PCT/IPEA/409) of International Application No. PCT/JP2007/052088 having a International filing date of Feb. 7, 2007.

* cited by examiner (A)  (B)

(A)  (B)

(A)  (B)

LOW-NOISE SCREW DEVICE

TECHNICAL FIELD

The present invention relates to a screw device having a screw shaft, a nut and rolling elements arranged rollably therebetween, and more particularly, to a noiseproofed low-noise screw device.

BACKGROUND ART

A ball screw having a screw shaft, a nut and a plurality of balls rollably therebetween is capable of reducing friction resistance caused in rotating the screw shaft relative to the nut as compared with a sliding contact type screw. Therefore, the ball screw is commercially practical in various fields, such as machine positioning mechanisms, feed mechanisms, vehicle steering gears and the like. In such a ball screw, when the screw shaft is rotated relative to the nut, each ball rolls on a loaded ball rolling path between the nut and the screw shaft. Once rolling up to one end of the loaded ball rolling path, the ball goes into a ball return path formed in the nut, rolls on the ball return path and then returns to the loaded ball rolling path again.

When balls circulates inside the nut as described above, the balls may come into contact with each other or the inner peripheral surface of the ball return path, which causes noise. In order to reduce noise of the ball screw, there are known a technique of interposing a retainer between balls thereby to prevent the balls from coming into contact with each other and a technique of providing a noise insulating member over a return pipe of the ball return path.

[Patent Document 1] Japanese Patent Laid-open Publication No. 2005-308081

DISCLOSURE OF INVENTION

Problems to be Solved by the Invention

The technique of providing a retainer between balls and the technique of providing a noise insulating member over a return pipe are useful in reducing noise of the ball screw. However, these techniques are not sufficient to respond to demands for further decrease of the noise.

In order to realize further decrease of noise level, the inventors investigated a relation between noise and vibration of each part of the nut. Specifically, as shown in FIG. 1, an acceleration pickup was fixed on each of an outer peripheral surface (1) of a flange 1a of the nut 1, an end surface (2) of the flange 1a and an outer peripheral surface (3) of a straight portion 1b of the nut 1, and vibration at each of them was measured (in this experiment, the end surface of the nut 1 was covered with a low-noise plate 2 and a cap 3 thereby to reduce effect from parts other than the above-mentioned parts (1) to (3)). At the same time, a microphone was installed 1 meter away from the ball screw, and noise from the ball screw was measured. Then, vibration of each of the nut parts was mapped out by frequency analysis, while noise was mapped out by frequency analysis, and intensities of these frequencies are compared.

FIG. 2 shows comparative results of mappings. In the figure, (1), (2) and (3) show mappings of frequency analyses of the respective positions where the acceleration pickup is fixed. The upper graphs show noise mappings measured with the microphone and the lower graphs show vibration mappings of the nut parts measured by the acceleration pickup. In each of the mappings, the horizontal axis indicates times and the vertical axis indicates frequencies. The shades of gray show frequency intensity, and whiter color shows higher frequency intensity.

As seen from the comparison results in (2), the frequency intensity peak of vibration of the end surface of the flange and the frequency intensity peak of noise appear both around the frequency of $2.0 \times 10^{-3}$. Meanwhile, as shown in (1) and (3), the mappings of the outer peripheral surface of the nut straight portion and the outer peripheral surface of the flange show no similarity between the frequency peak of vibration and the frequency intensity peaks of noise.

In view of these experimental results, the inventors have found that vibration at the end surface of the flange causes noise frequency peak, while vibrations at the outer peripheral surface of the flange and the outer peripheral surface of the straight portion of the nut do not have much influence on noise level, that is, the end surface of the nut flange vibrates, which acts as a speaker to increase noise level of the ball screw. As a reason for vibration of the flange end surface, it is guessed that when the nut vibrates around the center of gravity of the nut, vibration becomes stronger at the end surface farthest from the center of gravity of the nut and that the flange is thinner and weaker in rigidity than the nut straight portion and is apt to vibrate.

The present invention was carried out in view of the foregoing. The present invention has an object to reduce noise generated from the screw device.

In addition, in the above-mentioned experiment, the end surface of the nut 1 are covered with the cap 3 and low-noise plate 2 in order to reduce influences from parts (the end surfaces of the nut 1) other than the above-mentioned (1) to (3). If it is possible to reduce noise generated from the end surfaces of the nut 1, it becomes possible to further reduce noise generated from the screw device.

Then, the present invention has an object to provide a low-noise screw device capable of reducing noise generated from end surfaces of the nut 1.

Means for Solving the Problem

The present invention will now be described as follows.

In order to solve the above-mentioned problems, in one example of the invention, a low-noise screw device comprising: a screw shaft having a rolling-element rolling groove spirally formed on an outer peripheral surface thereof; a nut having a loaded rolling-element rolling groove spirally formed on an inner peripheral surface thereof, facing the rolling-element rolling groove of the screw shaft and having a rolling-element return path connecting an end of the loaded rolling-element rolling groove with an other end thereof; a plurality of rolling elements arranged in a loaded rolling-element rolling path between the rolling-element rolling groove of the screw shaft and the loaded rolling-element rolling groove of the nut and in the rolling-element return path; a flange provided at an axial end of the nut; and a low-noise plate having an outer diameter larger than an outer diameter of the nut and being provided over at least a part of an axial end surface of the flange that juts out from the nut so as to reduce noise generated from the end surface of the flange.

In another example, the rolling-element return path of the low-noise screw device includes: a straight path extending in an axial direction in the nut; and a circulation member having a direction change path connecting the loaded rolling-element rolling path to the straight path, and the low-noise plate covers the circulation member.

Also, the low-noise screw device, further comprising: a cap provided to sandwich the low-noise plate between the end surface of the flange and the cap; and cap fixing means for fixing the cap to the nut.

Also, in the low-noise screw device, a step difference is slightly provided between the end surface of the flange and an end surface of the nut, the low-noise plate has an outer-side plate covering the end surface of the flange and an inner-side plate provided to an inner side of the outer-side plate and covering the end surface of the nut, and the outer-side plate is thicker than the inner-side plate by a thickness corresponding to the step difference between the end surface of the nut and the end surface of the flange.

Also, in the low-noise screw device, each of the cap and the low-noise plate has a notch formed therein corresponding to a bolt hole of the flange so that a bolt inserted into the flange does not interfere with the cap and the low-noise plate.

Also, in the low-noise screw device, the low-noise plate is obtained by preparing foam resin with air bubbles therein and impregnating the foam resin with a lubricant.

Also, in the low-noise screw device, the cap is made of elastomer containing resin.

Also, in the low-noise screw device, the low-noise plate is lamination of a resin plate and a metal plate.

Also, in the low-noise screw device, the outer-side plate is lamination of a resin plate and a metal plate.

Also, in the low-noise screw device, the resin plate and the metal plate are not bonded to each other.

Also, in yet another example, a low-noise screw device comprising: a screw shaft having a rolling-element rolling groove spirally formed on an outer peripheral surface thereof; a nut main body having a loaded rolling-element rolling groove spirally formed on an inner peripheral surface thereof, facing the rolling-element rolling groove of the screw shaft and having a straight path for returning rolling elements rolling in a loaded rolling-element rolling path between the rolling-element rolling groove of the screw shaft and the loaded rolling-element rolling groove; a circulation member attached to an end surface of the nut main body and having a direction change path formed therein connecting the loaded rolling-element rolling path to the straight path; and a low-noise plate attached to the circulation member or the nut main body to which the circulation member is attached and covering the circulation member to prevent the circulation member from being exposed to outside so as to reduce noise generated from the circulation member, the low-noise plate being lamination of a resin plate and a metal plate.

Also, in the low-noise screw device, the metal plate of the low-noise plate is not in contact with the screw shaft, and the resin plate of the low-noise plate is in contact with the screw shaft.

Also, in the low-noise screw device, the resin plate of the low-noise plate is obtained by preparing foam resin with air bubbles therein and impregnating the foam resin with a lubricant.

EFFECTS OF THE INVENTION

According to one aspect of the invention, the low-noise plate absorbs vibration of the end surface of the flange, which enables reduction of noise generated from the end surface of the flange. This makes it possible to reduce noise of the screw device which shows correlation with the vibration of the end surface of the flange.

According to another aspect of the invention, the circulation member attached to the end surface of the nut is covered with the low-noise plate, which makes it possible to reduce noise caused in the direction change path of the circulation member.

According to another aspect of the invention, the low-noise plate is sandwiched between the end surface of the flange and the cap, which enables the low-noise plate to absorb vibration of the end surface of the flange with high degrees of efficiency.

According to another aspect of the invention, it is possible to bring the low-noise plate in close contact with both the end surface of the flange and the end surface of the nut that are provided with step difference therebetween.

According to another aspect of the invention, the bolt does not interfere with the cap and the low-noise plate, and therefore, it is possible to mount the flange onto another mechanical component securely.

According to another aspect of the invention, the low-noise plate of foam with air bubbles inside is used to absorb noise generated from the end surface of the flange with high degrees of efficiency.

According to another aspect of the invention, the cap made of elastomer containing resin absorbs noise generated from the end surface of the flange, which enables further reduction of noise generated in the screw device.

According to another aspect of the invention, it is possible to convert the vibrational energy of the flange into other energy by the damping material principle, which enables absorption of the vibration of the flange, thereby allowing further reduction of noise level.

According to another aspect of the invention, it is possible to convert the vibrational energy of the flange into other energy by the damping material principle, which enables absorption of the vibration of the flange, thereby allowing further reduction of noise level.

According to another aspect of the invention, the resin plate and the metal plate tend to rub against each other, which enables absorption of the vibration of the flange.

According to another aspect of the invention of, as the nut used here is an endcap type nut of which the circulation member and the rolling-element return path are hard to be exposed to the outside, the nut itself is hard to generate noise. Besides, as the circulation member is covered with the low-noise plate so as not to be exposed to the outside, it is possible to reduce noise generated from the circulation member with high degrees of efficiency. Further, as the low-noise plate is lamination of a resin plate and a metal plate, is absorbs the noise generated from the circulation member on the damping material principle. Hence, it is possible to further reduce noise generated from the end surface of the nut.

According to another aspect of the invention, it is possible to prevent leakage of noise from the gap between the low-noise plate and the screw shaft as the resin plate is in contact with the screw shaft.

According to another aspect of the invention, it is possible to reduce the friction coefficient of the screw shaft and the low-noise plate.

BRIEF DESCRIPTION OF REFERENCES

Figure 1:
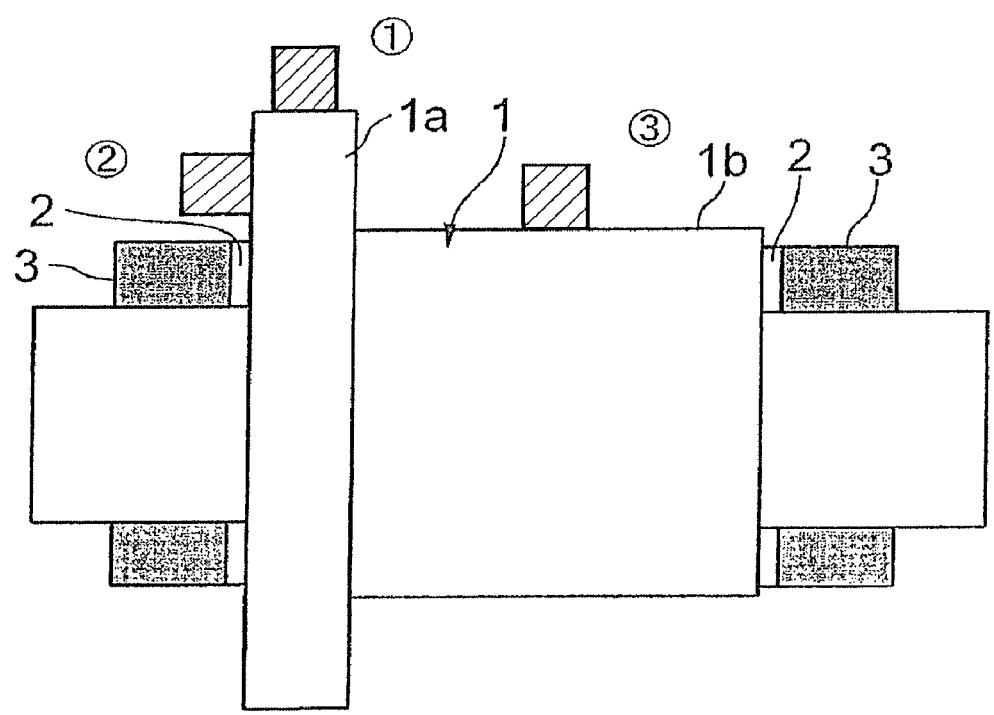
FIG. 1 is a view of arrangement of acceleration pickups fixed to a nut.
Figure 2:
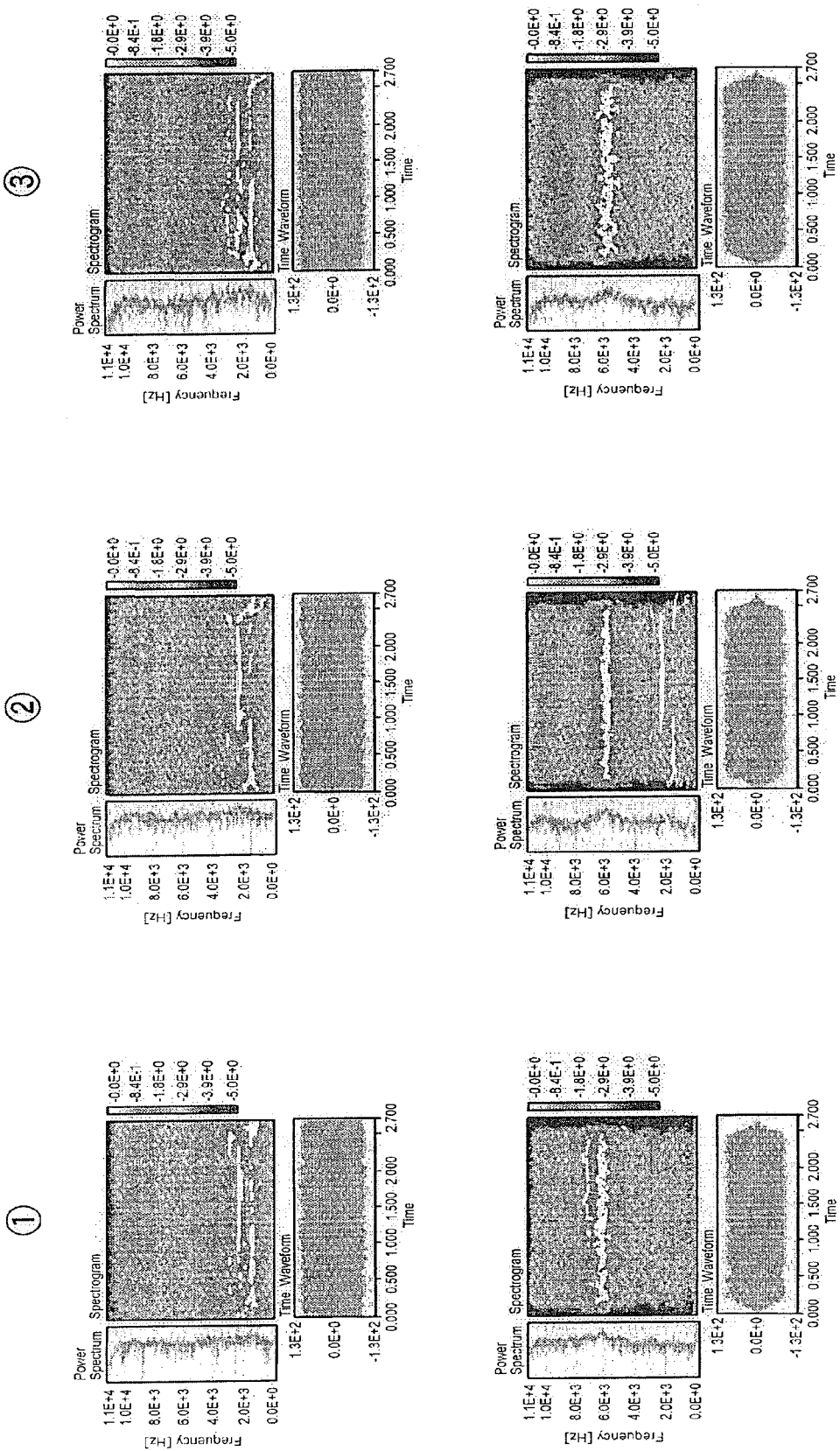
FIG. 2 shows graphs of comparative results of mapping (in FIG. 2, (1) to (3) show frequency analysis mapping corresponding to respective positions of the acceleration pickups)

5a . . . ball rolling groove (rolling-element rolling groove)
5 . . . screw shaft
6 . . . nut
6a . . . loaded ball rolling groove (loaded rolling-element rolling groove)
7 . . . ball (rolling element)
9 . . . flange
9c . . . bolt hole
9a . . . end surface
10, 44 . . . inner-side plate (low-noise plate)
11, 41 . . . outer-side plate (low-noise plate)
11a, 14a . . . notch
12 . . . low-noise plate
13, 14 . . . cap
17 . . . nut main body
17a . . . end surface
18 . . . circulation member
23 . . . direction change path (rolling-element return path)
30 . . . straight path (rolling-element return path)
31 . . . loaded ball rolling path (loaded rolling-element rolling path)
38 . . . bolt (fastening means)
39 . . . flange fastening bolt
42, 45 . . . resin plate
43, 46 . . . metal plate

BEST MODES FOR CARRYING OUT THE INVENTION

Figure 3:
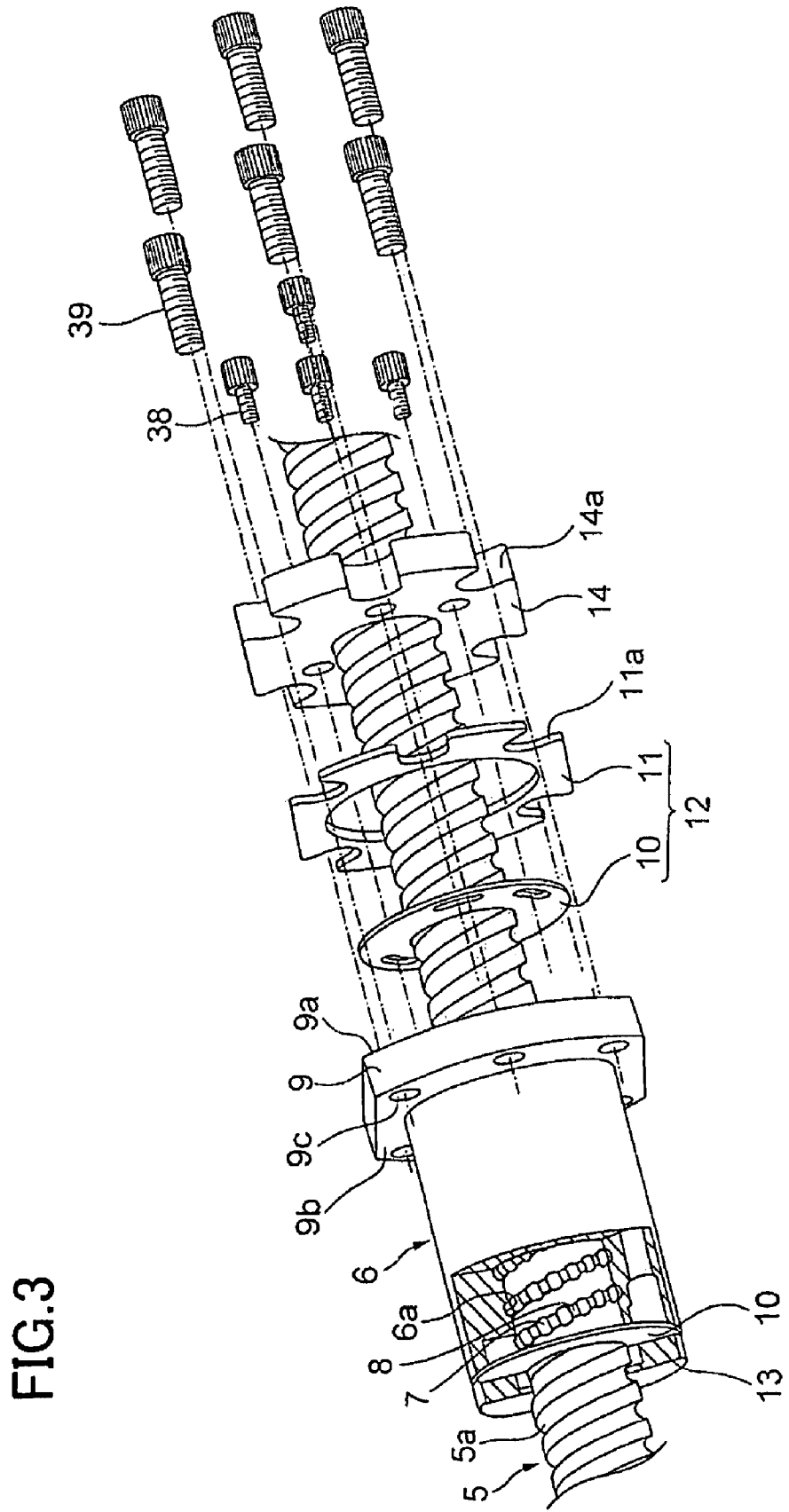
FIG. 3 is an exploded perspective view of a ball screw according to an embodiment of the present invention.
Figure 4:
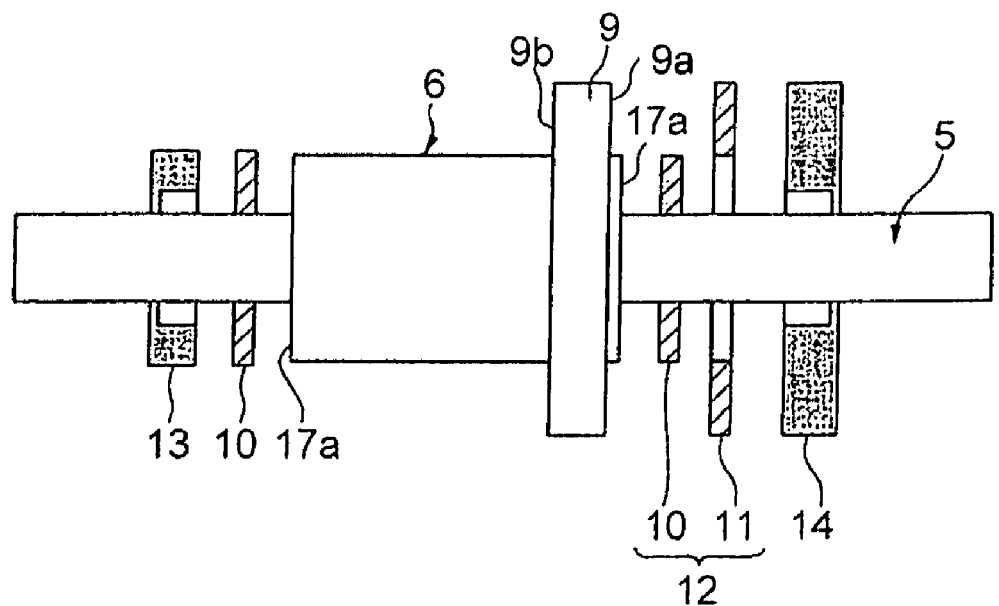
FIG. 4 is an exploded side view of the above-mentioned ball screw.

FIGS. 3 and 4 illustrate exploded views of a ball screw according to an embodiment of the present invention. The ball screw has a screw shaft 5 having a ball rolling groove 5a spirally formed on its outer peripheral surface as a rolling-element rolling groove and a nut 6 having a loaded ball rolling groove 6a as a loaded rolling-element rolling groove spirally formed on its inner peripheral surface and opposed to the ball rolling groove 5a (in FIG. 4, the ball rolling groove 5a of the screw shaft 5 and the loaded ball rolling groove 6a of the nut 6 are omitted). Ina loaded ball rolling path formed between the ball rolling groove 5a of the screw shaft 5 and the loaded ball rolling groove 6a of the nut 6, there is arranged a plurality of balls 7 as rolling elements.

At an axial end of the nut 6, a flange 9 is integrally formed to mount the nut 6 on another mechanical component. To both axial end surfaces of the nut 6, low-noise plates 10 and 12 are attached. Further, at the both axial end surfaces of the nut 6, caps 13 and 14 are provided so as to sandwich the low-noise plates 10 and 12 between the nut 6 and the caps 13 and 14.

Figure 5:
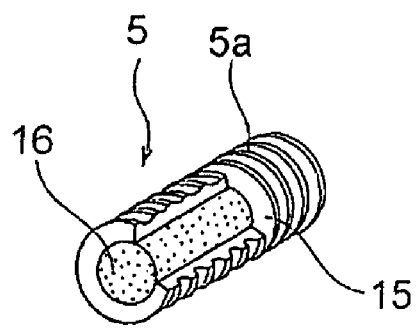
FIG. 5 is a perspective view of a screw shaft.

Description below is made in detail about the structure of each element. FIG. 5 illustrates the screw shaft 5. On the outer peripheral surface of the screw shaft 5, the ball rolling groove 5a is formed spirally having a given lead. The number of threads of the ball rolling groove 5a is not limited to one, but may be two, three or any number. In this embodiment, the number of threads of the ball rolling groove 5a is set to two.

The screw shaft 5 has a screw shaft main body 15 made of metal having a hollow portion and a vibration absorber 16 of a ceramic material for filling up the hollow portion. As the screw shaft 5 is formed by filling the hollow portion with the ceramic material, it is possible to reduce noise generated from the screw shaft 5. The vibration absorber 16 is put in the hollow portion of the screw shaft main body 15 in a state of fine particles, grains or fluid, and is formed inside the hollow portion into a shape conforming to a shape of the hollow portion.

In this embodiment, the hollow portion of the screw shaft main body 15 is pressure-filled with hydraulic fine particles or a hydraulic composition having a dominant component of non-hydraulic fine particles (product name "Z-ma", Sumitomo Osaka Cement Co., Ltd.) and hydrothermally synthesized to form the vibration absorber 16 of ceramic material integral with the screw shaft main body 15. Herein, the hydraulic fine particles mean fine particles that become hardened with water, and include, for example, silicate calcium compound particles, calcium aluminate compound particles, calcium fluoroaluminate compound particles, calcium sulfuraluminate compound particles, calcium alumino ferrite compound particles, calcium phosphate compound particles, hemihydrate plaster particles, anhydrous gypsum plaster particles, self-hardening calcium oxide compound particles and a mixture of at least two of these particles. A representative example of them is portland cement particles.

Besides, the non-hydraulic fine particles mean particles that are not hardened when they are in contact with water, and include such particles that their components elute in an alkaline state, acidic state or high-pressure steam environment, and react with other eluted components to form a product. When such non-hydraulic fine particles are added, the filling rate of a molding material during molding is increased, the void rate of an obtained molded product is decreased, and thereby dimensional stability of the molded product is improved. For example, typical non-hydraulic fine particles include calcium hydroxide particles, admixing gypsum particles, gypsum particles, calcium carbonate particles, slag particles, fly ash, silica particles, clay particles, silica fume particles and the like.

Here, the screw shaft may be a solid screw shaft or a screw shaft with a hollow which is not filled with a ceramic material.

Figure 6:
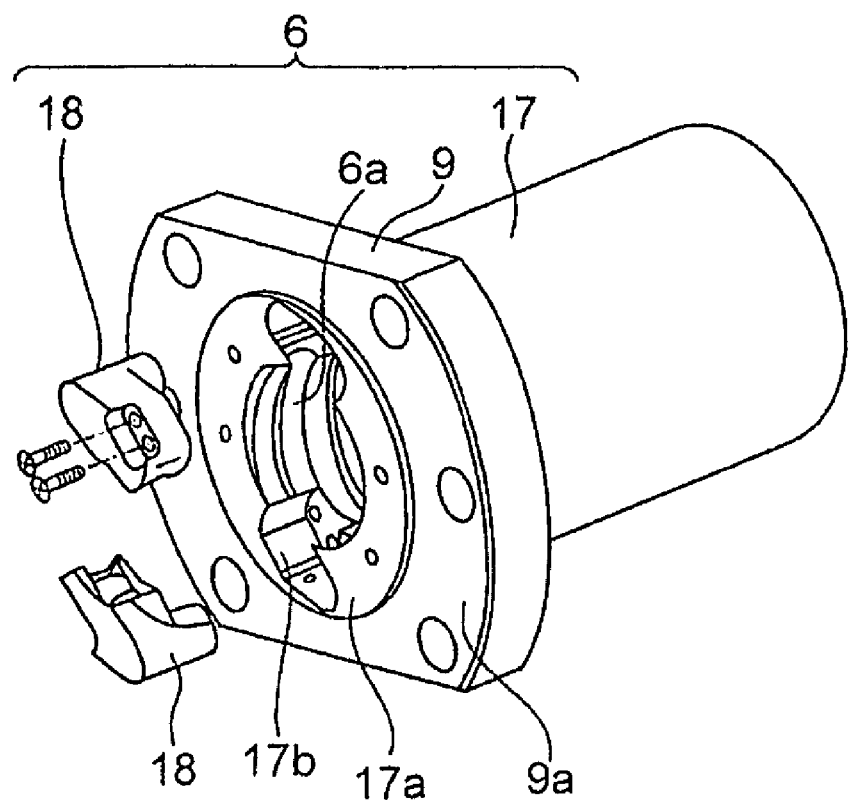
FIG. 6 is a perspective view of a nut.

FIG. 6 is a perspective view of the nut. The nut 6 has a nut main body 17 having the flange 9 and the loaded ball rolling groove 6a formed on the inner peripheral surface, and a circulation member 18 mounted on each end surface of the nut main body 17. In the end surface 17a of the nut main body 17, recess portions 17b are formed, and the circulation member 18 is fit in the recess portions 17b. The circulation member 18 is combined to recess portions 17b of the nut main body 17 by fastening means such as a bolt. The end surface 17a of the nut main body 17 (which is also the end surface 17a of the nut 6) slightly juts out from an end surface 9a of the flange 9, and there is a step difference between the end surface 17a of the nut main body 17 and the end surface 9a of the flange 9. The end surface 17a of the nut main body 17 is grinded thereby to use the surface as a datum for positioning the circulation member 18. If grinding is performed over the whole surface of the flange 9, it takes much time. Accordingly, the step difference is formed to grind the end surface 17a of the nut main body 17, only.

Figure 7:
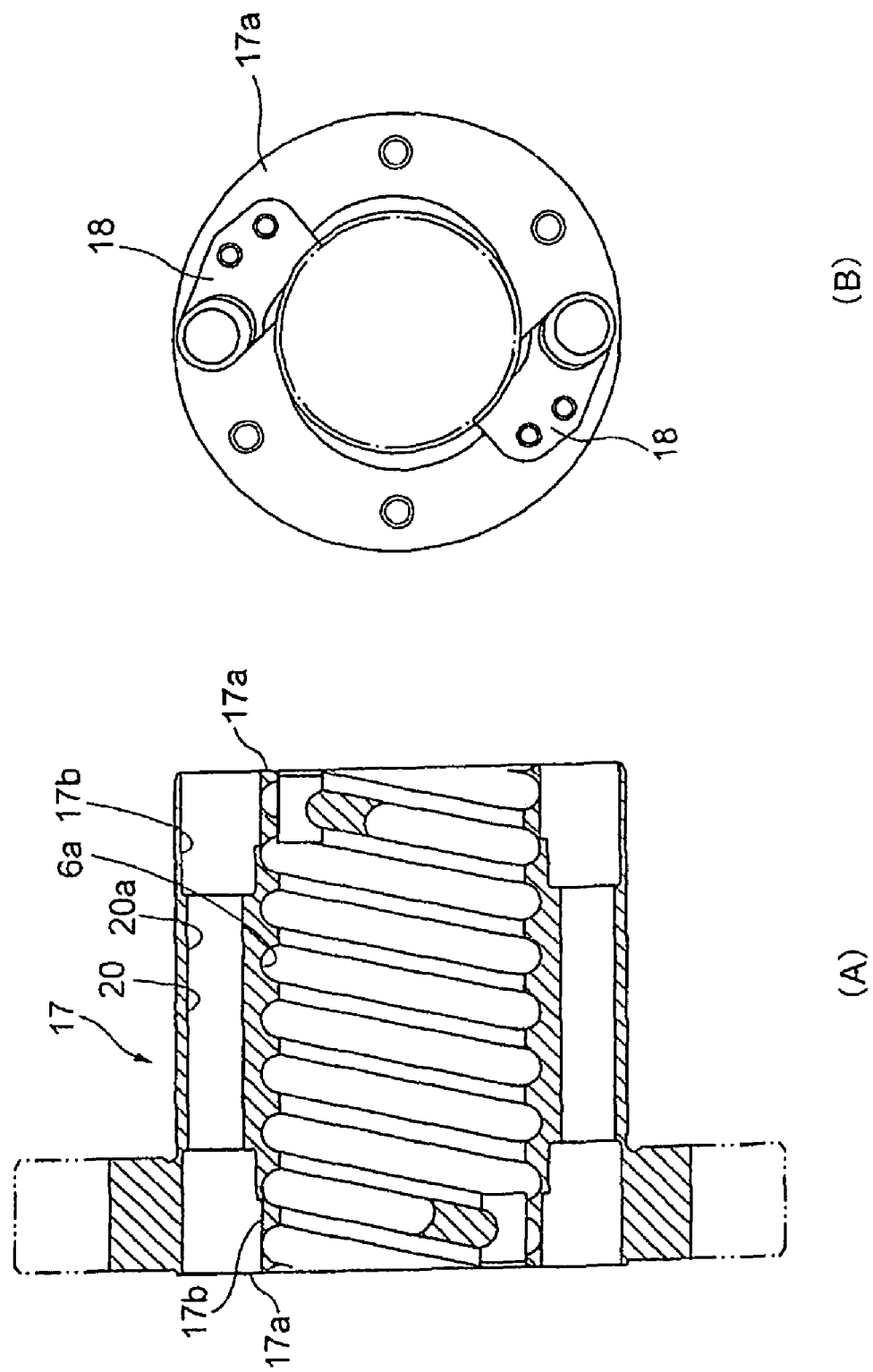
FIGS. 7(A) and 7(B) are views showing a nut main body (FIG. 7(A) is a cross sectional view taken along an axial direction of the nut main body, while FIG. 7(B) is a front view of the nut main body seen from the axial direction of the nut main body)

FIGS. 7(A) and 7(B) are detailed views of the nut main body 17. FIG. 7(A) is a cross sectional view of the nut main body 17 taken along the axial direction, and FIG. 7(B) is a front view of the nut main body 17 seen in the axial direction of the nut main body 17. In an inner peripheral surface of the nut main body 17, the loaded ball rolling groove 6a is formed spirally facing the ball rolling groove 5a of the screw shaft 5. At the edge of the nut main body 17, there are through holes 20 formed extending in the axial direction of the nut main body 17. Each through hole 20 has a center portion 20a of smaller diameter and both end portions (recess portions 17b) of larger diameter which is larger than that of the center portion 20a. In the center portion 20a of the through hole 20, a pipe member is inserted and the circulation member 18 is inserted in the recess portion 17b. At the axial end surface of the nut main body 17, the recess portion 17b is formed for mounting the circulation member 18 on the nut main body 17. The pipe member and the circulation member 18 are provided equal in number to the thread of the ball rolling grooves 5a (two in this embodiment).

Figure 8:
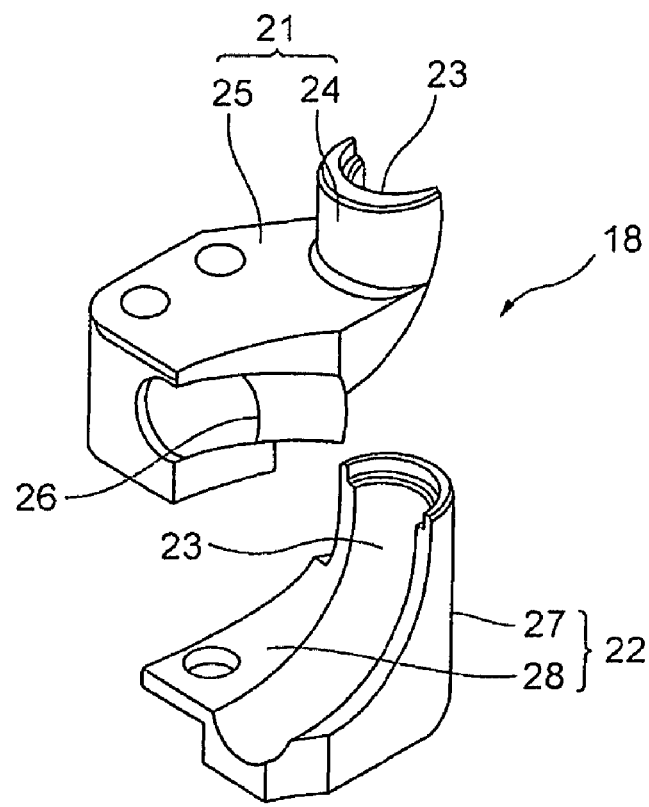
FIG. 8 is a detailed view of a circulation member (the circulation member having an inner-side portion and an outer-side portion separated)
Figure 9:
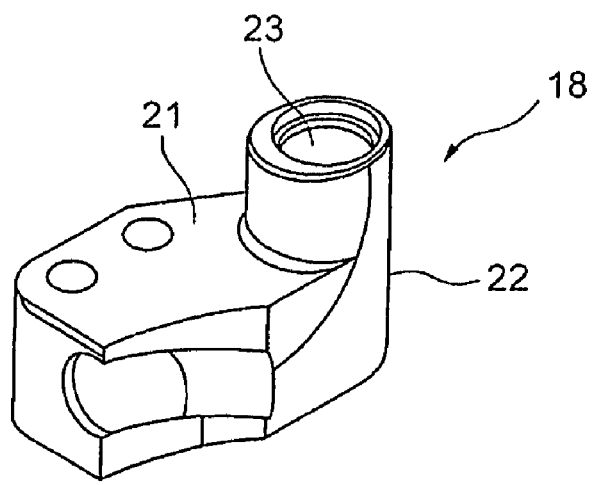
FIG. 9 is a detailed view of a circulation member (the circulation member having the inner-side portion and the outer-side portion coupled to each other)

FIGS. 8 and 9 are detailed views of the circulation member 18. The circulation member 18 is divided into two at the center of the direction change path 23, that is an inner-side portion 21 and an outer-side portion 22. The inner-side portion 21 of the circulation member 18 has a main body portion 24 in which a half of the direction change path 23 is formed and a flange 25 which is attached to the end surface of the nut main body 17. In the main body portion 24, a scooping portion 26 is formed integrally for scooping each ball 7 from the loaded ball rolling path. The scooping portion 26 juts toward the ball rolling groove 5a of the screw shaft 5, and scoops up each ball 7 rolling in the spiral ball rolling groove 5a from the ball rolling groove 5a into the direction change path 23.

The outer-side portion 22 of the circulation member 18 has a main body portion 27 in which a half of the direction change path 23 is formed and a flange 28. When the outer-side portion 22 of the circulation member 18 is assembled with the inner-side portion 21, the direction change path 23 having a round cross section is formed.

The circulation member 18 is made of elastomer containing resin. As the circulation member 18 scoops each ball 7 and changes a moving direction of the ball 7, it is likely to be in contact with the ball 7. As the circulation member 18 is made of a resin blended with elastomer, it becomes possible to reduce noise generated from the circulation member 18 when the circulation member 18 is in contact with the ball 7. Needless to say, the circulation member 18 may be formed of metal.

FIGS. 10(A) and 10(B) illustrate the circulation member 18 and the pipe member 29 fit in the nut main body 17. The ball return path connecting one end of the loaded ball rolling path to the other has a straight path 30 extending in the axial direction of the inner peripheral surface of the pipe member 29 and the direction change path 23 connecting the loaded ball rolling path with the straight path 30. As shown in FIG. 10(A), when seen in the axial direction of the screw shaft 5, each ball 7 is scooped in the tangential direction of the circular track of the loaded ball rolling path. Besides, as shown in FIG. 10(B), when seen from the side of the screw shaft 5, each ball 7 is scooped up in the direction which conforms to the lead angle of the loaded ball rolling path. Once scooped up in the tangential direction of the loaded ball rolling path, the ball 7 changes its moving direction in the direction change path 23, rolls along the circular track and enters the straight path 30 to roll therein along the straight track. Then, at the opposite-side direction change path 23, the ball 7 changes its moving direction and returns to the loaded ball rolling path again.

Figure 11:
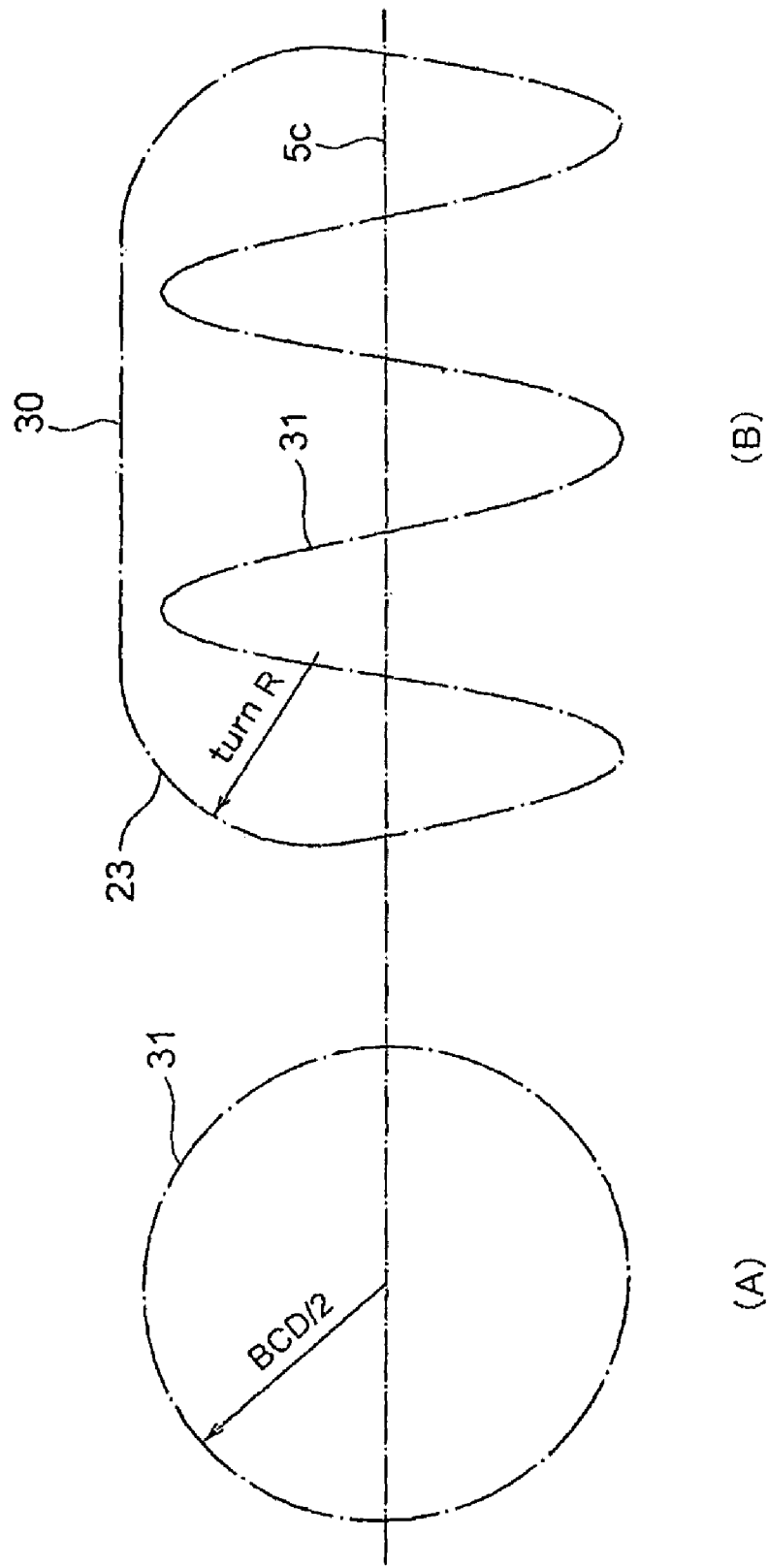
FIGS. 11(A) and 11(B) are views showing a track of each ball circulating in a ball circulation path (FIG. 11(A) shows the track of the ball moving in a loaded ball rolling path (seen from the axial direction of the screw shaft) and FIG. 11(B) shows the track of the ball in whole of the ball circulation path (seen from the side of the screw shaft)

FIGS. 11(A) and 11(B) illustrate the track of each ball 7 circulating in the straight path 30, the circular direction change path 23 and the spiral loaded ball rolling path. FIG. 11(A) shows a track of the ball 7 moving in the loaded ball rolling path 31 (seen in the axial direction of the screw device 5), while FIG. 11(B) shows a track of the ball 7 moving in the entire, endless, loaded ball rolling path 31 (seen from the side of the screw shaft 5). The track of the ball 7 in the loaded ball rolling path 31 take a spiral shape having a radius of BCD/2 (BCD: Ball Center Diameter). The track of the ball 7 in the straight path 30 is a straight line in parallel with the axial line 5c of the screw shaft 5. The track of the ball 7 in the direction change path 23 is a circular line having a curvature radius of R. The tangential direction of the track of the ball 7 changes continuously at junctures of -these loaded ball rolling path, direction change path 23 and straight path 30.

As shown in FIG. 3, the plural balls 7 are arranged in a ball return path and the loaded ball rolling path 31 between the screw shaft 5 and the nut 6. Each ball 7 is made of steel or ceramics. When the ball 7 is made of ceramics, it is possible to reduce noise generated from the ball 7. Between balls 7, a retainer 8 is provided to prevent balls 7 from being in contact with each other. As the retainer 8 is placed between balls 7, it is possible to prevent contact between balls 7.

As shown in FIGS. 3 and 4, there are low-noise plates 10 and 12 attached to both end surfaces of the nut 6. To one end surface of the nut 6, there is attached a low-noise plate 10 of smaller diameter conforming in shape to the end surface of the nut 6. At the other end surface of the nut 6, there is attached a low-noise plate 12 of larger diameter, which is such a plate as obtained by elongating the small-diameter low-noise plate 10 up to the flange outline. These low-noise plates 10 and 12 are sandwiched between the end surfaces of the nut 6 and the caps 13 and 14, respectively. As the back surface 9b of the flange 9 is used as a datum surface for mounting the nut 6 onto another mechanical component, the low-noise plate 12 and the cap 14 are attached to the surface of the flange (end surface 9a).

The low noise plate 12 has an outer-side plate 11 covering the end surface 9a of the flange 9 and an inner-side plate 10 covering the end surface 17a of the nut 6. The inner-side plate 10 has the same shape as that of the low-noise plate 10 attached to the opposite end surface of the nut 6. The outer-side plate 11 is slightly thicker than the inner-side plate 10, which thickness difference corresponds to the step difference between the end surface 17a of the nut 6 and the end surface 9a of the flange 9. With this structure, it is possible to bring the inner-side plate 10 and the outer-side plate 11 in close contact with the end surface 17a of the nut 6 and the end surface 9a of the flange 9 when the cap 14 is fixed to the nut 6.

Figure 12:
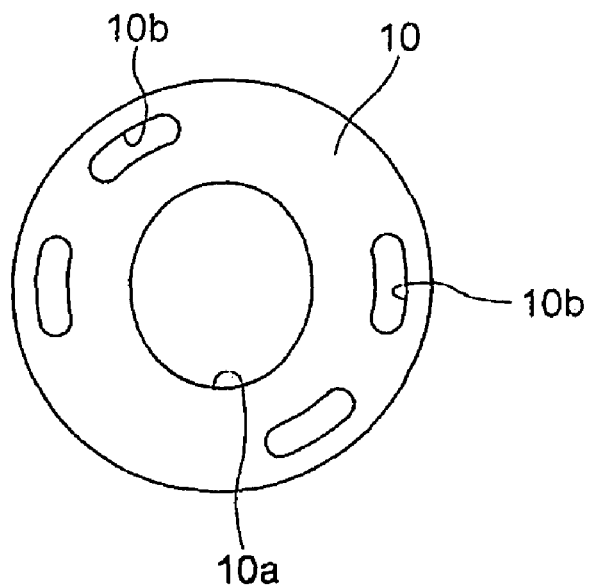
FIG. 12 is a plane view of an inner-side plate.

FIG. 12 shows the inner-side plate 10 attached to each end surface of the nut 6. The inner-side plate 10 takes a thin disk shape. The outer shape of the inner-side plate 10 is approximately identical to the outer shape of the nut main body 17 and has an irregularly circular center hole 10a at the center thereof. The center hole 10a takes an irregularly circular shape which conforms to the cross sectional shape taken along the line perpendicular to the axial direction of the screw shaft 5, and the inner peripheral edge of the inner-side plate 10 is in contact with the screw shaft 5. There are long holes 10b extending circumferentially in the in the inner-side plate 10. In each long hole 10b, a bolt 38 passes therethrough as fastening means (see FIG. 3). These long holes 10b are used because when the inner-side plate 10 is attached to the end surface of the nut 6, the inner-side plate 10 has to be rotated relative to the nut 6 to be in phase with the threads.

The inner-side plate 10 is a sponge-like and lightweight foam resin such as foam urethane and has air bubble inside it. For example, the inner-side plate 10 is manufactured by incorporating bubbles such as air bubbles or gas bubbles into urethane to form a sheet-shaped base material and cutting the sheet base material into a given shape. The inner-side plate 10 is impregnated with a lubricant. The material of the inner-side plate 10 is LACS (Registered trademark of THK CO., Ltd.) which is foam urethane with air bubbles impregnated with a lubricant, oil-retaining rubber (for example, oil-retaining HNBR) manufactured by impregnating rubber with a lubricant while vulcanizing the rubber and forming the rubber together with the. lubricant into a given shape, an oil-retaining felt obtained by impregnating a felt with a lubricant or the like. The lubricant contained in the inner-side plate 10 is supplied to a contact surface between the inner-side plate 10 and the screw shaft 5. The thickness of the inner-side plate 10 is set to, for example, 2 mm or less under constraints of installation space.

As the material of the inner-side plate 10 is a foam resin obtained by impregnating air-bubbles-containing resin with a lubricant, if a liquid such as coolant is spread over the inner-side plate 10, the lubricant rejects the liquid. Therefore, the inner-side plate does not become degraded. Beside, as the inner-side plate 10 is impregnated with the lubricant, the friction coefficient with the screw shaft can be reduced.

Figure 13:
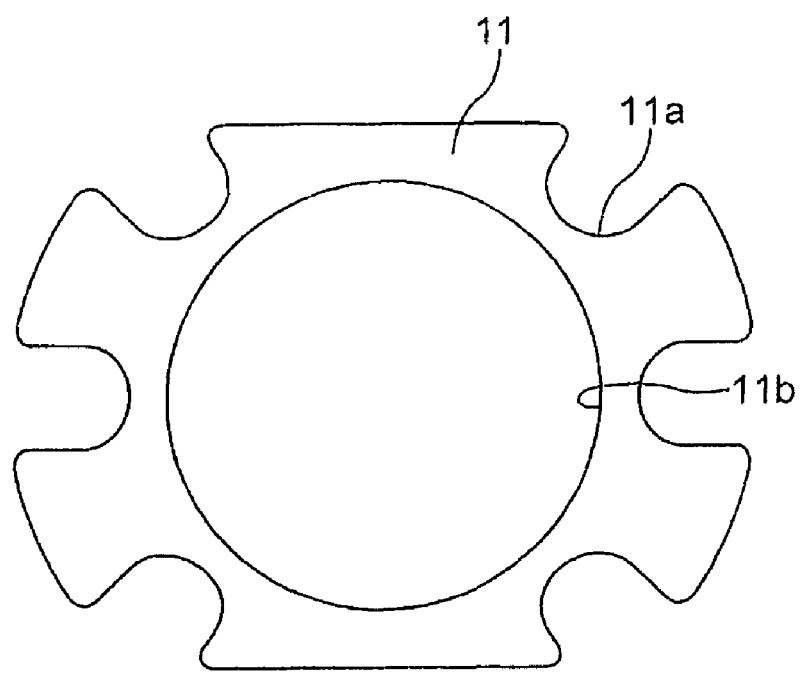
FIG. 13 is a plane view of an outer-side plate.

FIG. 13 illustrates an outer-side plate 11. The outer-side late 11 has a shape conforming to the shape of the flange 9, and a plurality of notches corresponding to bolt holes 9c of the flange 9 (see FIG. 3). The outer-side plate has a center hole 11b in its center. The inner-side plate 10 is fit into the center hole 11b. As described above, the outer-side plate 11 is thicker than the inner-side plate 10, which thickness difference corresponds to the step difference between the end surface 9a of the flange 9 and the end surface 17a of the nut 6. The outer-side plate 11 is a foam plastic impregnated with a lubricant like the inner-side plate 10.

Figure 14:
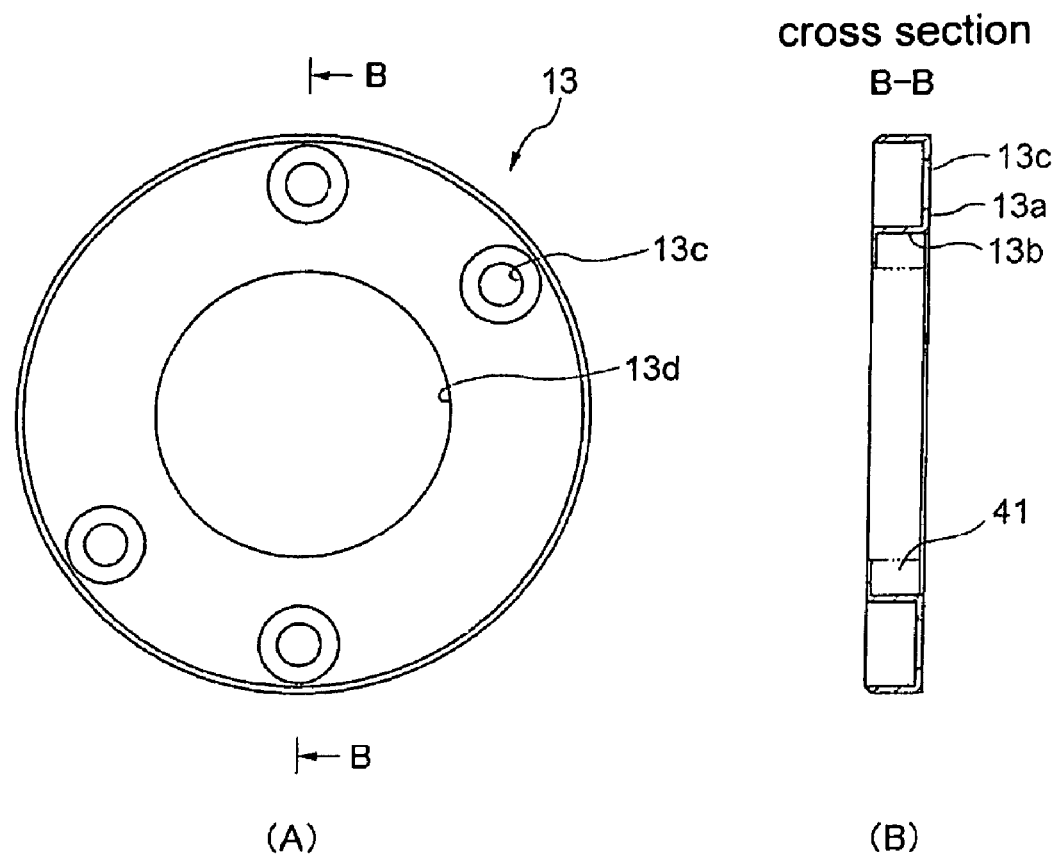
FIGS. 14(A) and 14(B) show a cap (FIG. 14(A) is a front view and FIG. 14(B) is a cross sectional view taken along the line B-B of FIG. 14(A))

FIG. 14 shows a cap 13 of small diameter attached to one end surface of the nut 6. The cap 13 has a planar surface like the inner-side plate 10, and the inner-side plate 10 is placed between the cap 13 and the end surface 17a of the nut 6 (see FIG. 4). The cap 13 has a close-contact portion 13a which is in close contact with the inner-side plate 10 and a seal accommodating portion 13b. The seal accommodating portion 13b of the cap has a labyrinth seal or wiper ring (ring-shaped seal member 41) in order to prevent leakage of the lubricant from the inside of the nut 6 and to remove foreign materials. The cap 13 has through holes 13c into which bolts 38 are inserted. The cap 13 has a center hole 13d formed at the center thereof in which the screw shaft 5 is inserted. This cap 13 is manufactured by compounding elastomer pellet and resin, for example nylon pellet, welding and injection molding.

Figure 15:
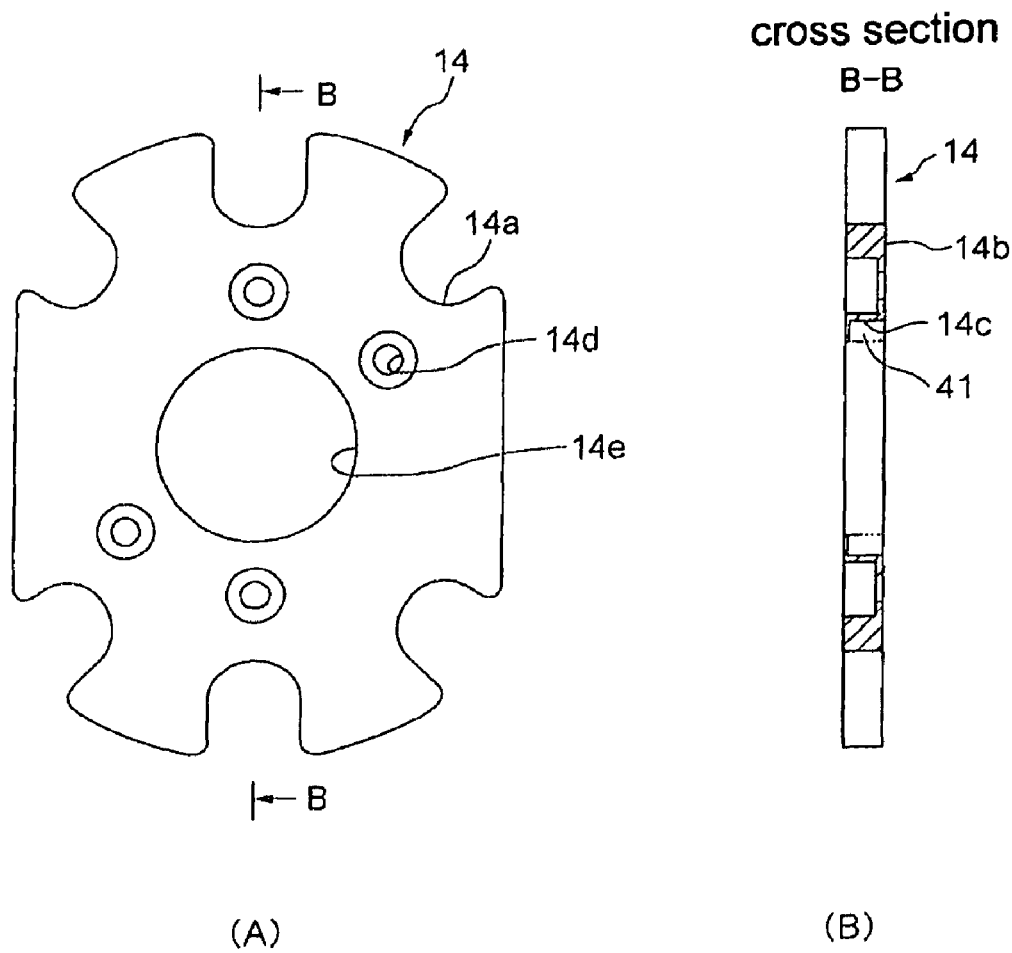
FIGS. 15(A) and 15(B) show a cap (FIG. 15(A) is a front view and FIG. 15(B) is a cross sectional view taken along the line B-B of FIG. 15(A))

FIG. 15 illustrates a cap 14 attached to a flange-side end surface of the nut 6. This cap 14 has a planar surface like the inner-side plate 10 and the outer-side plate 11 fit thereto, and the inner-side plate 10 and the outer-side plate 11 are placed between the end surface 9a of the flange 9 and the end surface 17a of the nut 6. The cap 14 has a plurality of notches 14a corresponding to the bolt holes 9c of the flange 9.

This cap 14 has a close-contact portion 14b which is in close contact with the inner-side plate 10 and the outer-side plate 11 and a seal accommodating portion 14c. The seal accommodating portion 14c has a seal member 41 like the above-mentioned cap 13. The cap 14 has through holes 14d in which bolts 38 are inserted. Besides, the cap 14 has a center hole 14e in which the screw shaft 5 is inserted. This cap 14 is also an elastomer containing resin. If noise reduction is allowed enough by the low-noise plate 12, the caps 13 and 14 do not need to contain elastomer.

Figure 10:
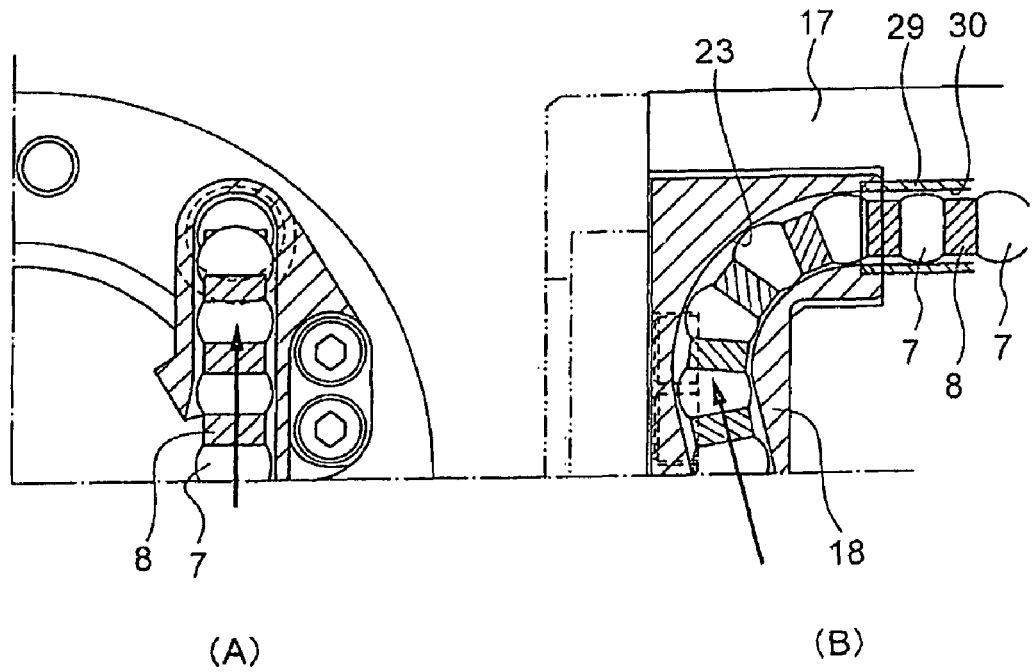
FIGS. 10(A) and 10(B) are views showing a pipe member and the circulation member mounted in the nut main body (FIG. 10(A) is a view seen from the axial direction of the screw shaft and FIG. 10(B) is a view seen from the side of the screw shaft)

As shown in FIG. 10, the pipe member 29 and the circulation member 18 are fit into the nut main body 17, the nut 6 is assembled with the screw shaft 5, and balls 7 and retainers 8 are placed between the nut 6 and the screw shaft 5. Then, as shown in FIG. 3, the inner-side plate 10 and the cap 13 are attached to one end surface of the nut 6. Next, the inner-side plate 10 and the outer-side plate 11 are brought into contact with the flange-side end surface of the nut 6 sequentially, the cap 14 is fit to the nut 6 in such a manner that these plates are sandwiched with the cap 14 and the end surface of the nut 6, and the cap 14 is mounted onto the nut 6 with bolts 38.

Figure 16:
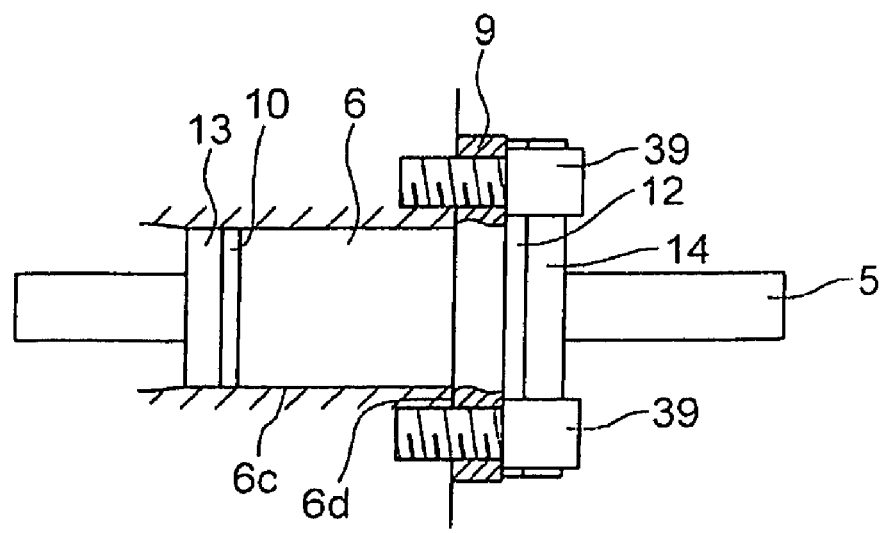
FIG. 16 is a cross sectional view of a ball screw mounted on a mechanical component.
Figure 17:
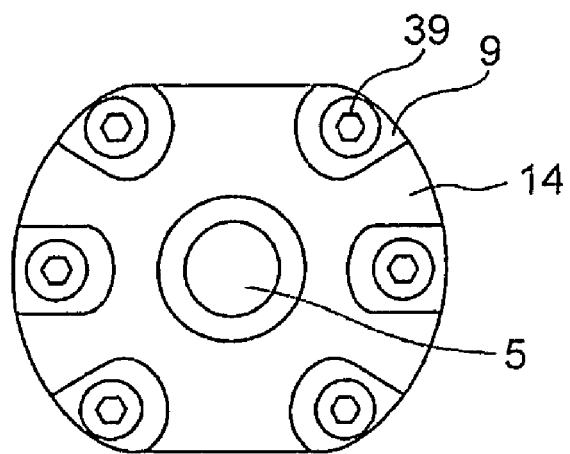
FIG. 17 is a front view of the ball screw mounted on the mechanical component.

FIGS. 16 and 17 show an example of the ball screw mounted on a mechanical component. Bolts 39 are inserted into bolt holes 9c of the flange 9 and are screwed in the mechanical components. When the nut 6 is mounted onto the mechanical component, the outer peripheral surface 6c of the nut 6 and the end surface 9a of the flange 9 are used as datum surfaces for mounting the nut 6 onto the mechanical component. As the outer-side plate 11 and the cap 14 have notches formed therein corresponding to the bolt holes 9c, the bolts 39 does not interfere with the outer-side plate 11 and the cap 14. Accordingly, the flange 9 can be tightly mounted on the mechanical component.

When the screw shaft 5 is rotated relative to the nut 6, the nut 6 moves in the axial direction of the screw shaft 5. At this time, inside the nut 6, the plural balls 7 roll in the loaded ball rolling path 31 between the ball rolling groove 5a and the loaded ball rolling groove 6a. When rolling up to an end of the loaded ball rolling path 31, each of the balls 7 is scooped up in the direction change path 23 of the circulation member 18, rolls in the straight path 30 and the opposite-side direction change path 23, and then, returns to the original loaded ball rolling path 31.

In this embodiment, the nut is an endcap type nut which is hard to expose the rolling-element return path and the circulation member 18 to the outside. Therefore, noise from the nut itself is smaller than those of a return pipe nut and a deflector-type nut. The circulation member 18 is covered with the inner-side plate 10 to prevent exposure of the circulation member 18 to the outside, and the flange 9 is covered with the outer-side plate 11. This structure makes it possible to reduce noise generated from the flange end surface and the circulation member 18. Further, as the inner-side plate 10 is in contact with the screw shaft 5, it is also possible to prevent leakage of noise from a gap between the inner-side plate 10 and the screw shaft 5.

The present invention is not limited to the above-described embodiments but may be embodied in various forms without departing from the scope of the present invention. For example, a ball circulation system is not limited to the above-described endcap system, but may adopt various systems such as a return pipe system, deflector system and the like. The rolling-elements may be rollers instead of the balls. In addition, the low-noise plate may consist only of the outer-side plate in contact with the end surface of the flange with no inner-side plate provided. Further, the outer-side plate and the inner-side plate are formed integral with each other. Furthermore, the low-noise plate may cover not only the end surface of the flange but also the outer peripheral surface of the flange.

Figure 18:
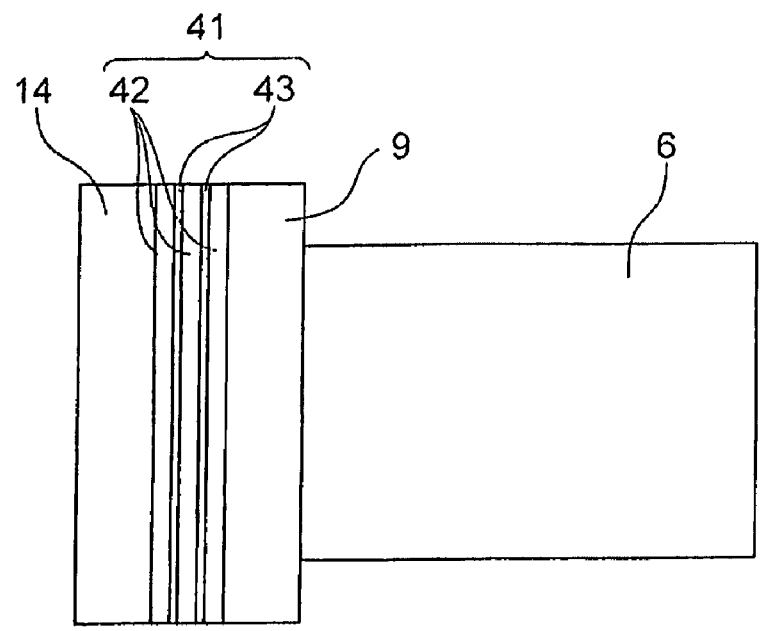
FIG. 18 is a side view of the nut to which an outer-side plate of another example is attached.
Figure 19:
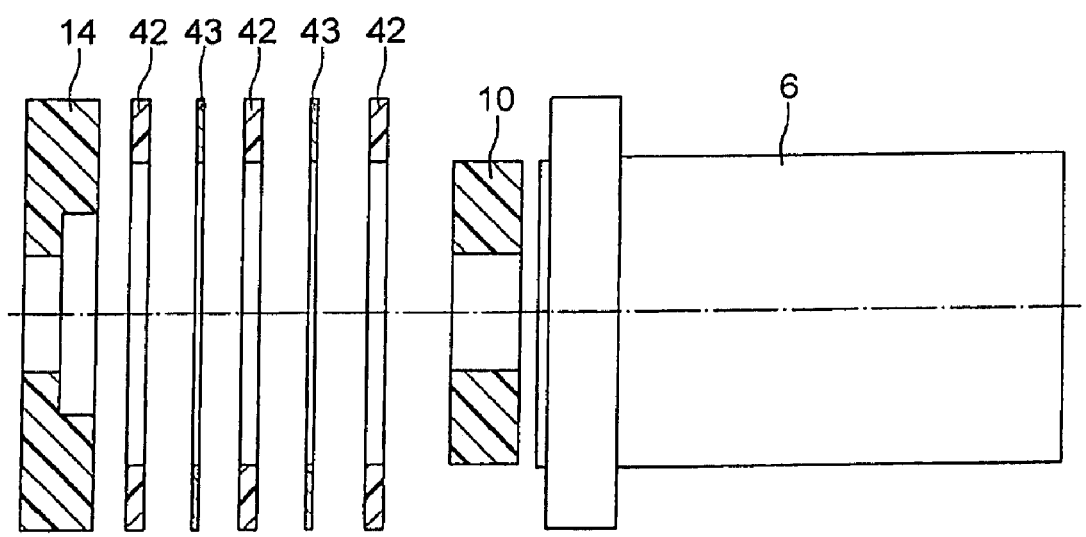
FIG. 19 is an exploded perspective view of the outer-side plate of the other example.

FIGS. 18 and 19 show other examples of the outer-side plate 11. The outer-side plate 41 of this example has a lamination of resin plates 42 and metal plates 43 of stainless or the like. Each resin plate 42 is a plate obtained by impregnating foam resin such as foam urethane with a lubricant. Each metal plate 43 is sandwiched by two resin plates 42 and the number of resin plates 42 is larger by one than the number of metal plates 43. For example, the number of the resin plates 42 is three and the number of the metal plates 43 is two. The outer-side plate 41 is sandwiched between the flange 9 and the cap 14, and resin plates 42 are placed to the outside. Accordingly, the resin plates 42 are in contact with the flange 9 and the cap 14. Each metal plate 43 and each resin plate 42 are doughnut-shaped like the outer-side plate 41 so that the inner-side plate 10 is fit inside them. Each metal plate 43 and each resin plate 42 are not bonded by an adhesive agent. The structures of the nut 6, the inner-side plate 10 and the cap 14 are the same as those of the screw device of the above-mentioned embodiment. Accordingly, they are denoted by the like reference numerals and explanation of them is omitted here.

As the resin plates 42 and the metal plates 43 are laminated one on another thereby to consist in the outer-side plate 41, the vibrational energy of the flange 9 is converted into the heat energy by the damping material principle (deformation of the resin plates 42 by bending vibration and rubbing of the resin plates 42 and the metal plates 43), thereby absorbing vibration of the flange 9.

Figure 20:
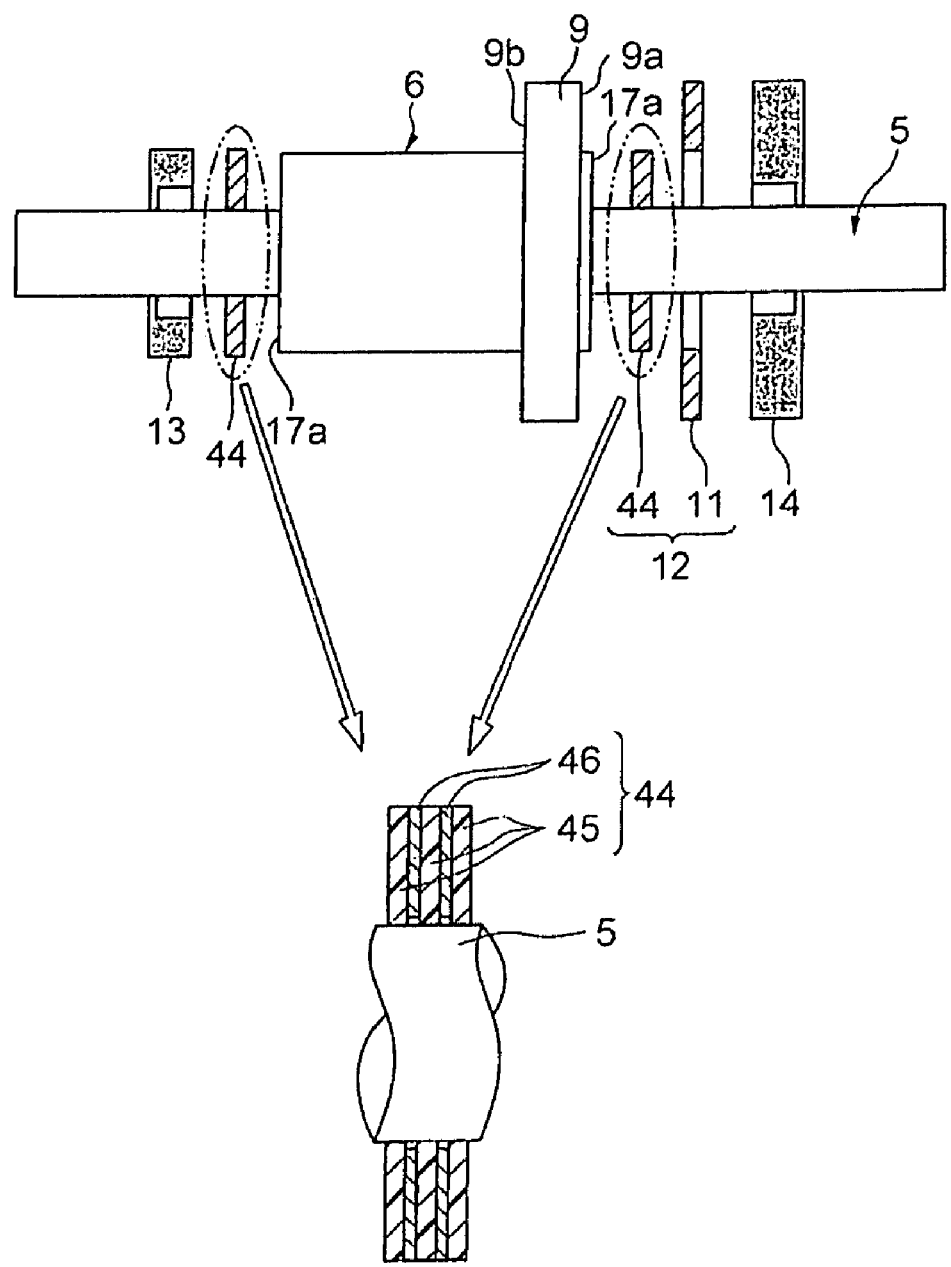
FIG. 20 is an exploded perspective view of a ball screw to which an inner-side palate of another example is attached.

FIG. 20 shows another example of the inner-side plate 10. An inner-side plate 44 of this example is lamination of resin plates 45 and metal plates 46 made of stainless or the like. Each resin plate 45 is formed by impregnating a foam resin such as foam urethane with a lubricant, like the above-mentioned inner-side plate 10. The inner-side plate 44 is sandwiched between the end surface 17a of the nut 6 and the caps 13 and 14. The resin plates 45 are in contact with the end surfaces 17a of the nut 6 and the caps 13 and 14. The resin plate 45 and the metal plate 46 take annular shapes conforming to that of the end surface 17a of the nut 6. The inner diameter of each resin plate 45 is equal to the diameter of the cross area of the screw shaft 5 and resin plates 45 are in contact with the screw shaft 5. The inner diameter of each metal plate 46 is slightly larger than that of the resin plate 45 and the metal plates 46 are not in contact with the screw shaft 5. In other words, there is formed a small gap between the metal plates 46 and the screw shaft 5. The resin plates 45 are not bonded to the metal plates 46 by an adhesive agent or the like. The structures of the screw shaft 5, the nut 6, the outer-side plate 11 and the caps 13 and 14 are the same as those in the screw device of the above-mentioned embodiment, and therefore, they are denoted by the like reference numerals and explanation of them is omitted here.

As the resin plates 45 and the metal plates 46 are laminated to consist in the inner-side plate 44, the noise generated from the circulation member 18 on the damping material principle (deformation of the resin plates 45 by bending vibration and rubbing of the resin plates 45 and the metal plates 46) can be reduced in an effective manner, thereby absorbing vibration of the flange 9.

The present specification is based on Japanese Patent Application No. 2006-031665 filed on Feb. 8, 2006, the entire contents of which are expressly incorporated by reference herein.

The invention claimed is:

1. A low-noise screw device comprising:
    a screw shaft having a rolling-element rolling groove spirally formed on an outer peripheral surface thereof;
    a nut having a loaded rolling-element rolling groove spirally formed on an inner peripheral surface thereof, facing the rolling-element rolling groove of the screw shaft and having a rolling-element return path connecting an end of the loaded rolling-element rolling groove with an other end thereof;
    a plurality of rolling elements arranged in a loaded rolling-element rolling path between the rolling-element rolling groove of the screw shaft and the loaded rolling-element rolling groove of the nut and in the rolling-element return path;
    a flange provided at an axial end of the nut; and
    a plate having an outer diameter larger than an outer diameter of the nut and being provided over at least a part of an axial end surface of the flange that juts out from the nut so as to reduce noise generated from the end surface of the flange,
    wherein
    a step difference is provided between the end surface of the flange and an end surface of the nut,
    the plate has an outer-side plate part covering the end surface of the flange and an inner-side plate part provided to an inner side of the outer-side plate and covering the end surface of the nut, and
    the outer-side plate part is thicker than the inner-side plate part by a thickness corresponding to the step difference between the end surface of the nut and the end surface of the flange.

2. The low-noise screw device according to claim 1, wherein
    the rolling-element return path includes: a straight path extending in an axial direction in the nut; and a circulation member attached to each end surface of the nut and having a direction change path connecting the loaded rolling-element rolling path to the straight path, and
    the plate covers the circulation member.

3. The low-noise screw device according to claim 1 or 2, further comprising:
    a cap provided to sandwich the plate between the end surface of the flange and the cap; and
    cap fixing means for fixing the cap to the nut.

4. The low-noise screw device according to claim 3, wherein the cap is made of elastomer containing resin.

5. The low-noise screw device according to claim 1 or 2, wherein the plate is obtained by preparing foam resin with air bubbles therein and impregnating the foam resin with a lubricant.

6. The low-noise screw device according to claim 1 or 2, wherein the plate is lamination of a resin plate and a metal plate.

7. The low-noise screw device according to claim 6, wherein the resin plate and the metal plate are not bonded to each other.

8. The low-noise screw device according to claim 6, wherein
the metal plate of the plate is not in contact with the screw shaft, and
the resin plate of the plate is in contact with the screw shaft.

9. The low-noise screw device according to claim 8, wherein the resin plate of plate is obtained by preparing foam resin with air bubbles therein and impregnating the foam resin with a lubricant.

10. The low-noise screw device according to claim 1, wherein the outer-side plate part is lamination of a resin plate and a metal plate.

11. The low-noise screw device according to claim 10, wherein the resin plate and the metal plate are not bonded to each other.

12. The low-noise screw device comprising:
a screw shaft having a rolling-element rolling groove spirally formed on an outer peripheral surface thereof;
a nut having a loaded rolling-element rolling groove spirally formed on an inner peripheral surface thereof, facing the rolling-element rolling groove of the screw shaft and having a rolling-element return path connecting an end of the loaded rolling-element rolling groove with another end thereof;
a plurality of rolling elements arranged in a loaded rolling-element rolling path between the rolling-element rolling groove of the screw shaft and the loaded rolling-element rolling groove of the nut and in the rolling-element return path;
a flange provided at an axial end of the nut;
a plate having an outer diameter larger than an outer diameter of the nut and being provided over at least a part of an axial end surface of the flange that juts out from the nut so as to reduce noise generated by the end surface of the flange;
a cap provided to sandwich the plate between the end surface of the flange and the cap; and
cap fixing means for fixing the cap to the nut;
wherein each of the cap and the plate has a notch formed therein corresponding to a bolt hole of the flange so that a bolt inserted into the flange does not interfere with the cap and the plate.

* * * * *